(12) United States Patent
Tseng et al.

(10) Patent No.: US 8,098,985 B2
(45) Date of Patent: Jan. 17, 2012

(54) PHOTOGRAPHING MODULE

(75) Inventors: Te-Sheng Tseng, Taichung (TW); Chen-Yi Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 65 days.

(21) Appl. No.: 12/608,610

(22) Filed: Oct. 29, 2009

(65) Prior Publication Data

US 2010/0232777 A1 Sep. 16, 2010

(30) Foreign Application Priority Data

Mar. 13, 2009 (TW) ................ 98203901 U

(51) Int. Cl.
*G03B 13/34* (2006.01)

(52) U.S. Cl. ...................................... 396/133

(58) Field of Classification Search .......... 396/133
See application file for complete search history.

(56) References Cited

U.S. PATENT DOCUMENTS

| | | | |
|---|---|---|---|
| 7,595,944 B2 * | 9/2009 | Huang et al. | 359/822 |
| 7,871,207 B2 * | 1/2011 | Akabane et al. | 396/439 |
| 2007/0166022 A1 * | 7/2007 | Lai | 396/133 |

* cited by examiner

*Primary Examiner* — Clayton E Laballe
*Assistant Examiner* — Dennis Hancock
(74) *Attorney, Agent, or Firm* — Morris Manning & Martin LLP; Tim Tingkang Xia, Esq.

(57) ABSTRACT

This invention provides a photographing module that at least includes a lens unit, an electrically controlled focusing mechanism, an elastic unit, a supporting base and a photosensitive device. A movable member of the electrically controlled focusing mechanism is electrically driven to move the lens unit attached therewith along an optical axis so as to perform a focusing function. The elastic unit is disposed with the electrically controlled focusing mechanism and has a plurality of bridge regions. Each bridge region has a plurality of radial segments which are connected together, so that they can evenly absorb accumulated stress coming from a distortion, a plane shift along the optical axis and a certain amount of tilt of the lens unit while it is being rotated to be disposed in the photographing module or during its other movements. The elastic unit effectively utilizes available space to lengthen the bridge regions so its spring constant can be effectively reduced.

10 Claims, 5 Drawing Sheets

PHOTOGRAPHING MODULE

BACKGROUND OF THE INVENTION

1. Field of the Invention

The present invention relates to a photographing module comprising an electrically controlled focusing mechanism. More particularly, the present invention relates to a photographing module that uses a voice coil motor (VCM) structure as an electrically controlled focusing mechanism.

2. Description of the Related Art

There is a need to install an actuator for many electronic devices, such as a mobile phone with vibration function, a magnetic head having an actuator that moves vertically, a camera equipped with an auto focus module, etc. For those devices, the most popular type of actuator is the voice coil motor (VCM). Since VCMs are able to achieve precise movement and have lower prices, they are well suited for use as microactuators for short-distance movement within electronic devices.

A short-stroke microactuator can be used in a photographing module as an electrically controlled focusing mechanism for the auto focusing function. Referring to FIG. 1, a sectional view depicting the structure of a prior art photographing module 1 with an electrically controlled focusing mechanism is shown. The photographing module 1 mainly comprises a supporting base 40, a lens carrier 12, a lens unit 10 and a VCM. The supporting base 40 contains an accommodating space for the lens carrier 12 to be disposed therein. The lens unit 10 consisting of one or more lens elements is housed within the lens carrier 12, and moreover, there is thread engagement between the lens unit 10 and the lens carrier 12. A magnet 20, yoke 22 and coil 24 constitute the aforementioned VCM that is disposed within the accommodating space between the lens carrier 12 and the supporting base 40. The photographing module 1 is equipped with an elastic unit to provide a better moving and restoring speed of the VCM. The elastic unit includes an upper elastic member 32 and a lower elastic member 34. The upper elastic member 32 is disposed above the lens carrier 12, while the lower elastic member 34 is disposed below the lens carrier 12.

FIG. 2 is a top view showing the structure of a prior art upper elastic member 32 or lower elastic member 34. The elastic member 200 is of a flat plate shape, comprising an outer peripheral area 210, an inner peripheral area 220 and a plurality of bridge regions 230 connecting the outer peripheral area 210 and inner peripheral area 220. Each bridge region 230 has one end connected to the outer peripheral area 210 and the other end connected to the inner peripheral area 220. The outer peripheral area 210 of the elastic member 200 is secured to the supporting base 40, and the inner peripheral area 220 is secured to the lens carrier 12. When a current with a predetermined polarity is passed through the coil 24, an electromagnetic moving force generated. Since the coil 24 is attached to the lens carrier 12 and the lower elastic member 34, when the coil 24 is driven by the magnetic force, the lens carrier 12 will be pushed accordingly and move to a predetermined position along the optical axis, so as to perform an auto focusing function. The yoke 22 is used for enclosing the magnetic field lines between the coil 24 and the magnet 20. When a current with an opposite polarity is passed through the coil 24, the lens carrier 12 is driven to the original position.

Since the outer peripheral areas of both the upper elastic member 32 and the lower elastic member 34 are secured to the supporting base 40 while their inner peripheral areas are secured to the lens carrier 12, when the lens carrier 12 moves forward or backward relative to the supporting base 40 along the optical axis, stress is accumulated on the bridge regions 230 between the outer peripheral area and the inner peripheral area because those bridge regions 230 are elastically deformed. As shown in FIG. 2, the bridge regions 230 of the prior art elastic member 200 are in the shape of connected concentric arc segments; that is, a plurality of arcs of the same or similar shape which are connected to each other. When the elastic member is stressed as a result of the lens unit 10 being screwed into the lens carrier 12, or from a pulling force generated as the lens unit is shifted along the optical axis, or when the lens unit 10 is tilted, the resulting stresses cannot be absorbed by the arc-shaped portions of the bridge regions 230 because they all retain a similar shape. Consequently, stress is concentrated on the connecting joints between the bridge regions 230 and the outer/inner peripheral areas 210, 220. Accordingly, both the inner and outer peripheral areas 210, 220 will suffer too much internal vertical stress, thus over time it results in elastic fatigue of the connecting joints and thereby reducing the life span of the elastic member 200.

SUMMARY OF THE INVENTION

The present invention provides a photographing module that at least comprises a lens unit, an electrically controlled focusing mechanism, an elastic unit, a supporting base and a photosensitive device. The lens unit at least comprises one lens element. The electrically controlled focusing mechanism at least comprises a movable member and a fixed member, wherein the movable member has a hollow central portion near an optical axis and is secured to the lens unit; the fixed member is secured to the supporting base; and the movable member is electrically driven to move the lens unit disposed therewith along the optical axis. The elastic unit has outer peripheral areas, inner peripheral areas and a plurality of bridge regions, wherein the inner peripheral area defines a central opening; the outer peripheral area and the inner peripheral area define an accommodating space therebetween; and the bridge regions are symmetrically disposed in the accommodating space. Each of the bridge regions has one end connected to the outer peripheral area and an opposite end connected to the inner peripheral area. Each of the bridge regions has a plurality of radial segments which are connected together, with all of the radial segments pointing toward a center of the central opening. The inner peripheral area is connected to the movable member of the electrically controlled focusing mechanism, and the outer peripheral area is attached to either the fixed member of the electrically controlled focusing mechanism or the supporting base. The supporting base has a hollow central portion near the optical axis and is disposed with the electrically controlled focusing mechanism. The photosensitive device is disposed with the supporting base at the image forming side of the photographing module.

In another aspect, the present invention provides a photographing module that at least comprises a lens unit, an electrically controlled focusing mechanism, an elastic unit, a supporting base and a photosensitive device. The lens unit at least comprises one lens element. The electrically controlled focusing mechanism at least comprises a movable member and a fixed member, wherein the movable member has a hollow central portion near an optical axis and is secured to the lens unit; the fixed member is secured to the supporting base; and the movable member is electrically driven to move the lens unit disposed therewith along the optical axis. The elastic unit has outer peripheral areas, inner peripheral areas and a plurality of bridge regions, wherein the inner peripheral area defines a central opening; the outer peripheral area and the inner peripheral area define an accommodating space therebetween; and the bridge regions are symmetrically disposed in the accommodating space. Each of the bridge regions has one end connected to the outer peripheral area and an opposite end connected to the inner peripheral area. Each of the bridge regions has a plurality of radial segments which are connected together, with all of the radial segments pointing toward an outer side of the elastic unit to form a plurality of symmetrically distributed centers. The inner peripheral area is connected to the movable member of the electrically controlled focusing mechanism, and the outer peripheral area is connected to either the fixed member of the electrically controlled focusing mechanism or the supporting base. The supporting base has a hollow central portion near the optical axis and is disposed with the electrically controlled focusing mechanism. The photosensitive device is disposed with the supporting base at the image forming side of the photographing module.

In still another aspect, the present invention provides a photographing module that at least comprises an electrically controlled focusing mechanism, an elastic unit, a supporting base and a photosensitive device. The electrically controlled focusing mechanism at least comprises a movable member and a fixed member, wherein the movable member includes at least one lens element and is centered about an optical axis; the fixed member is disposed with the supporting base; and the movable member is electrically driven to move along the optical axis. The elastic unit has outer peripheral areas, inner peripheral areas and a plurality of bridge regions, wherein the inner peripheral area defines a central opening; the outer peripheral area and the inner peripheral area define an accommodating space therebetween; and the bridge regions are symmetrically disposed in the accommodating space. Each of the bridge regions has one end connected to the outer peripheral area and an opposite end connected to the inner peripheral area. Each of the bridge regions has a plurality of radial segments which are connected together, with all of the radial segments pointing toward a center of the central opening. The inner peripheral area is disposed with the movable member of the electrically controlled focusing mechanism, and the outer peripheral area is disposed with the fixed member of the electrically controlled focusing mechanism or with the supporting base. The supporting base has a hollow central portion near the optical axis and is disposed with the electrically controlled focusing mechanism. The photosensitive device is disposed with the supporting base at the image forming side of the photographing module.

In yet another aspect, the present invention provides a photographing module that at least comprises an electrically controlled focusing mechanism, an elastic unit, a supporting base and a photosensitive device. The electrically controlled focusing mechanism at least comprises a movable member and a fixed member, wherein the movable member includes at least one lens element and is centered about an optical axis; the fixed member is disposed with the supporting base; and the movable member is electrically driven to move along the optical axis. The elastic unit has outer peripheral areas, inner peripheral areas and a plurality of bridge regions, wherein the inner peripheral area defines a central opening; the outer peripheral area and the inner peripheral area define an accommodating space therebetween; and the bridge regions are symmetrically disposed in the accommodating space. Each of the bridge regions has one end connected to the outer peripheral area and an opposite end connected to the inner peripheral area. Each of the bridge regions has a plurality of radial segments which are connected together, with all of the radial segments pointing toward an outer side of the elastic unit to form a plurality of symmetrically distributed centers. The inner peripheral area is disposed with the movable member of the electrically controlled focusing mechanism, and the outer peripheral area is disposed with the fixed member of the electrically controlled focusing mechanism or with the supporting base. The supporting base has a hollow central portion near the optical axis and is disposed with the electrically controlled focusing mechanism. The photosensitive device is disposed with the supporting base at the image side of the photographing module.

DETAILED DESCRIPTION OF THE PREFERRED EMBODIMENTS

Figure 5:
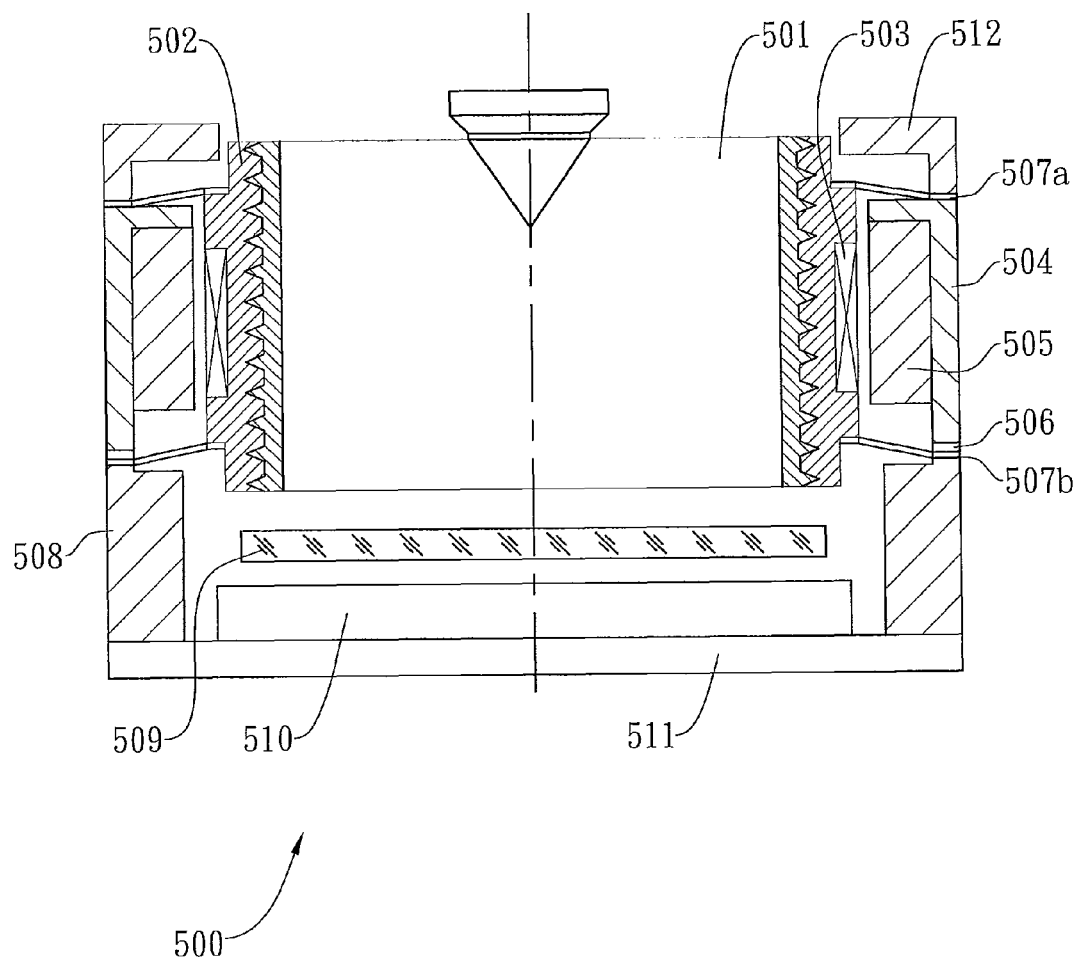
FIG. 5 is a sectional view of a photographing module of the present invention.

The present invention will now be described in detail with reference to certain embodiments thereof as illustrated in the accompanying drawings. FIG. 5 is a sectional view of a photographing module according to an embodiment of the present invention. The photographing module 500 in FIG. 5 comprises a lens unit 501, a lens carrier 502, at least one coil 503, at least one yoke 504, at least one magnet 505, at least one insulating piece 506, an elastic unit constituted of a first elastic member 507a and a second elastic member 507b, a supporting base 508, an optical filter 509, a photosensitive device 510, a circuit substrate 511 and a cover 512.

The supporting base 508 has a hollow central portion near the optical axis to form an accommodating space. The supporting base 508 is mounted on the circuit substrate 511, and the photosensitive device 510 is mounted on the circuit substrate 511 within the accommodating space of the supporting base 508. The optical filter 509 is disposed over the photosensitive device 510 within the accommodating space of the supporting base 508. The at least one yoke 504 is disposed on the supporting base 508, and the at least one magnet 505 is attached to the inner rim of the yoke 504. The lens carrier 502 also has a hollow central portion near the optical axis to form an accommodating space, and is disposed over the optical filter 509. The lens unit 501 comprises at least one lens (not shown), and is coupled to the lens carrier 502 within its accommodating space through the engagement of mating threads. A recess is formed surrounding an outer wall of the lens carrier 502. The at least one coil 503 is embedded within the recess and is directly opposite the magnet 505. The cover 512 has a hollow central portion around the optical axis and is disposed above the yoke 504. The cover 512 is configured to protect the components within the photographing module 500. The first elastic member 507a is disposed between the cover 512 and a top of the yoke 504. The second elastic member 507b is disposed between a bottom of the yoke 504 and the supporting base 508.

Figure 1:
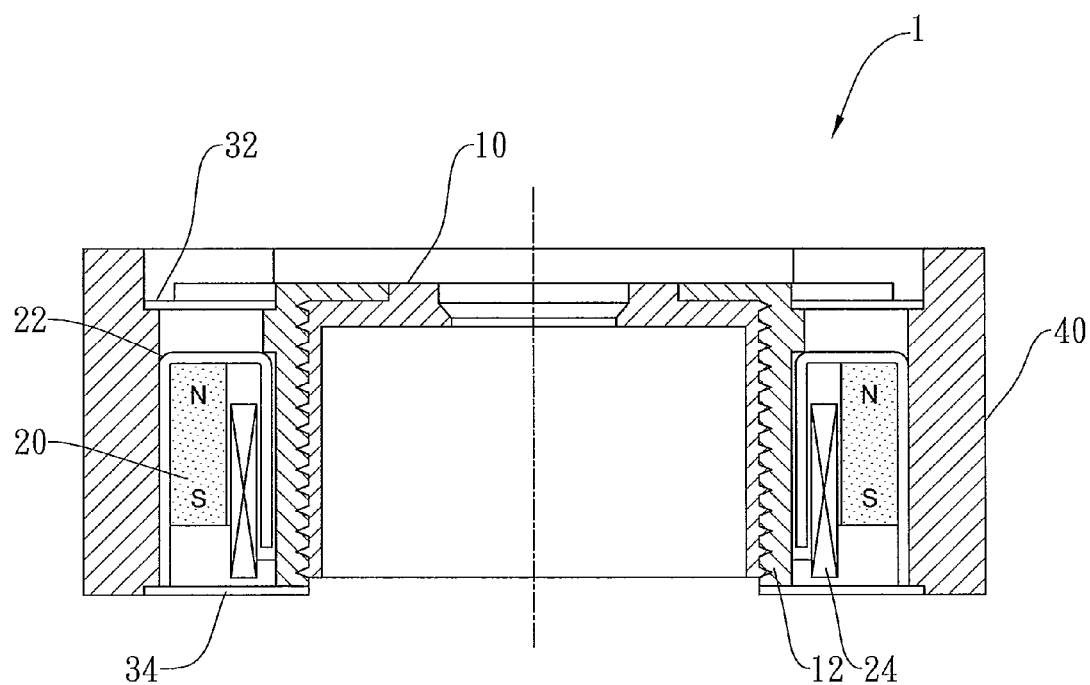
FIG. 1 is a sectional view of a prior art photographing module with an electrically controlled focusing mechanism.
Figure 2:
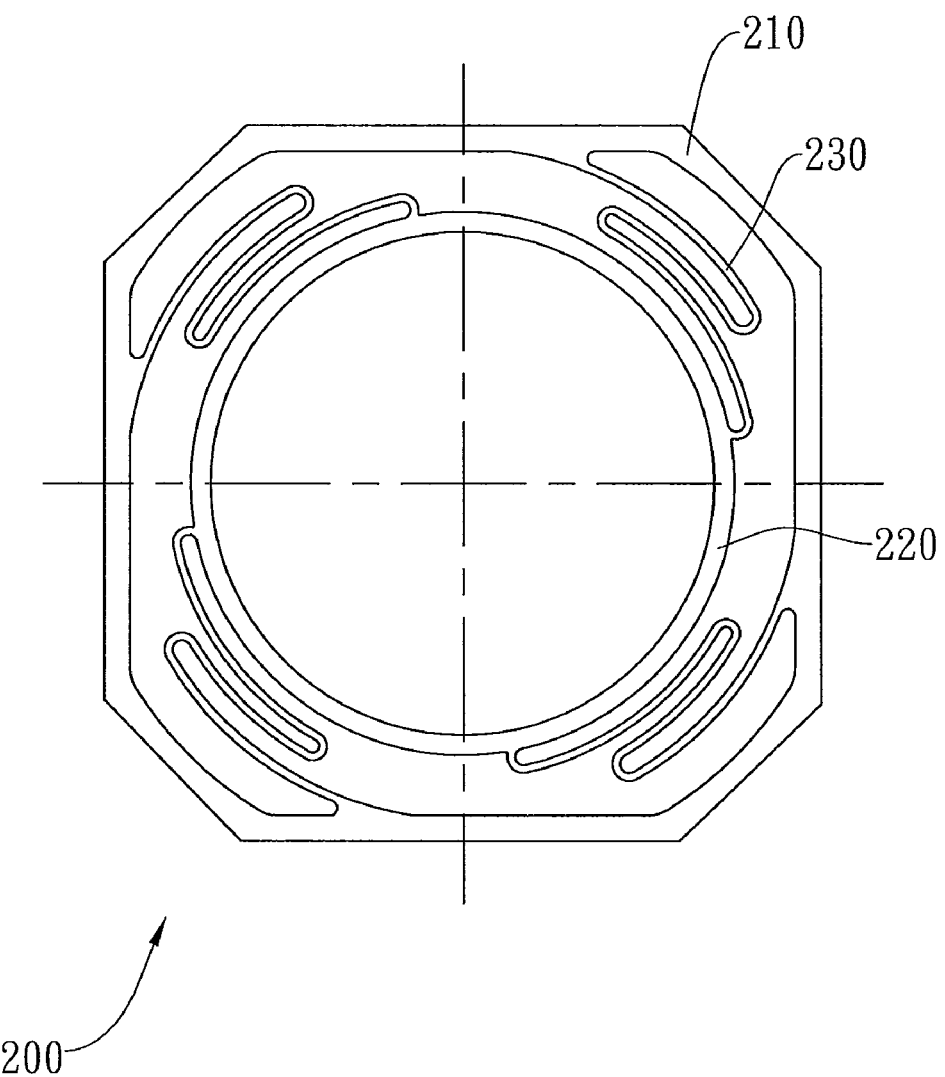
FIG. 2 is a top view of a prior art elastic member used in the photographing module in FIG. 1.
Figure 3:
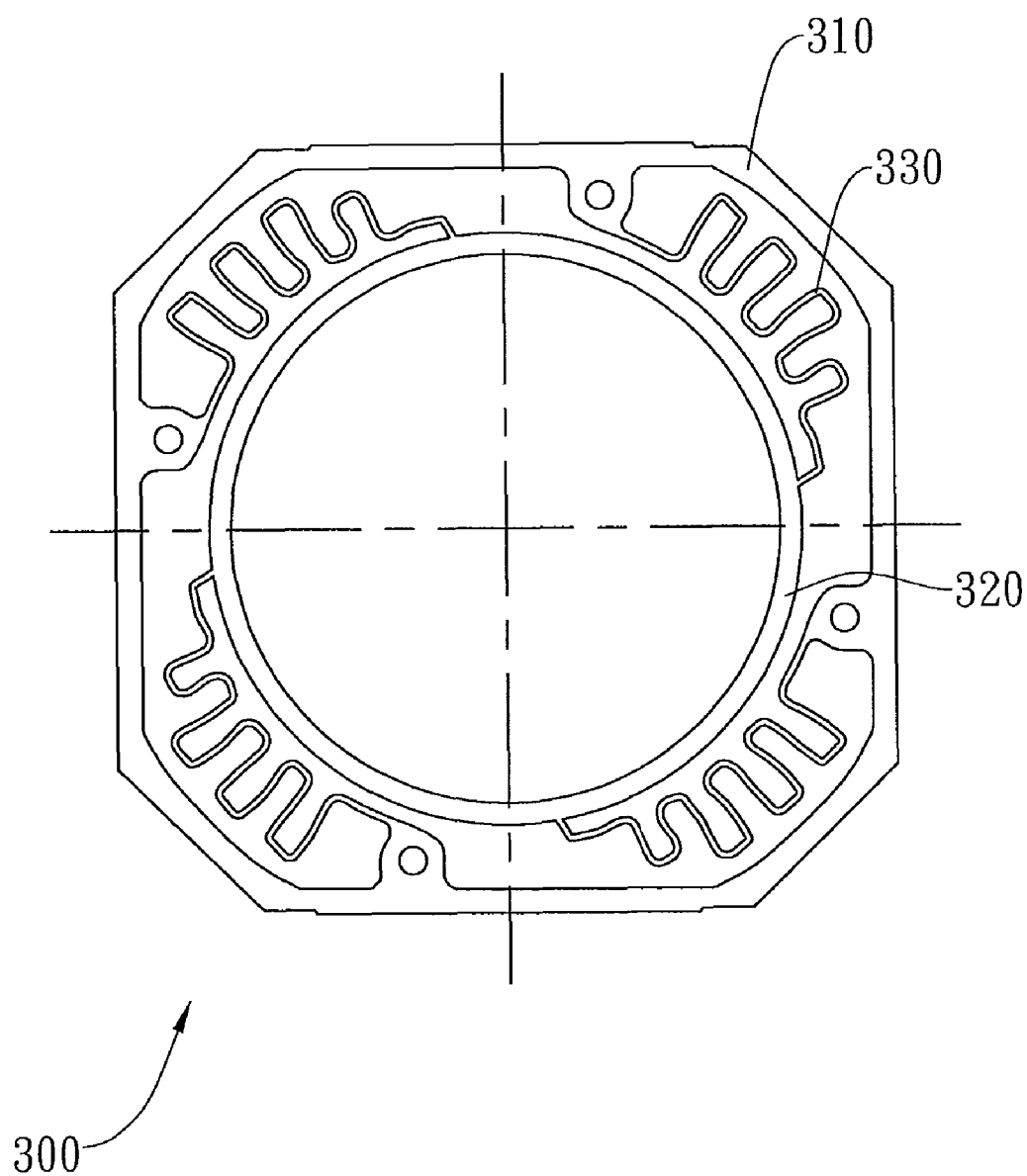
FIG. 3 is a top view of an elastic member used in the photographing module of the present invention.

FIG. 3 is a top view of the first elastic member 507a/second elastic member 507b according to an embodiment of the photographing module 500. The structure of the first elastic member 507a/second elastic member 507b and its relationship with other components within the photographing module 500 will be described in detail with reference to FIG. 3. As FIG. 3 shows, the elastic member 300, which is used as the first elastic member 507a or second elastic member 507b in this invention, is of a flat plate shape. The elastic member 300 has an outer peripheral area 310, an inner peripheral area 320 and a plurality of bridge regions 330. The inner peripheral area 320 defines a central opening of the elastic member 300; the outer peripheral area 310 and the inner peripheral area 320 define an accommodating space therebetween. The bridge regions 330 with equal elasticity 330 are symmetrically disposed in the accommodating space which is defined by the outer peripheral area 310 and the inner peripheral area 320. Each of the bridge regions 330 has one end connected to the outer peripheral area 310 and an opposite end connected to the inner peripheral area 320. Each of the bridge regions 330 has a plurality of radial segments which are connected together, with all of the radial segments pointing toward a center of the central opening. When the elastic member 300 is used as the first elastic member 507a, at least part of its inner peripheral area 320 is secured to a front-end area of the lens carrier 502, and at least part of its outer peripheral area 310 is secured between a top of the yoke 504 and the cover 512. In other words, at least part of the outer peripheral area 310 is attached to the cover 512 or the yoke 504. When the elastic member 300 is used as the second elastic member 507b, at least part of its inner peripheral area 320 is secured to a rear-end area of the lens carrier 502, and at least part of its outer peripheral area 310 is secured between a bottom of the yoke 504 and the supporting base 508. Moreover, at least an insulating piece 506 is disposed between a bottom of the yoke 504 and the supporting base 508. In this invention, the outer peripheral area 310 of the second elastic member 507b can be attached to the insulating piece 506 or the supporting base 508. Preferably in the elastic member 300 of the present invention, the central opening of the inner peripheral area 320 is a circle, and the plurality of bridge regions 330 has the same shape and the same width.

Referring to FIG. 5, the photographing module 500 of the present invention uses an electrically controlled focusing mechanism that is based on a VCM structure to perform the focusing function. When the photographing module 500 is supplied with electric power, the electric current flows from the supporting base 508, for example, through the second elastic member 507b to the at least one coil 503, where a magnetic field is induced that has the same field direction as the magnet 505. The yoke 504 encloses the magnetic field lines between the coil 503 and the magnet 505. The insulating piece 506 is used for keeping the second elastic member 507b electrically insulated from the yoke 504. The magnetic force generated by the coil 503 and the magnet 505 produces a driving force and pushes the coil 503 forward; the lens carrier 502 is thereby driven to move forward along the optical axis, moving to a predetermined position to perform the focusing function. Since part or all of the inner peripheral area of the first elastic member 507a/second elastic member 507b is secured to the lens carrier 502, the inner peripheral area is driven forward accordingly when the lens carrier 502 moves forward. This makes the first elastic member 507a/second elastic member 507b strained and distorted. When the electric current flowing into the coil 503 is reduced or reversed in direction, the force exerted on the lens carrier 502 is reduced or goes in an opposite direction accordingly. Accumulated stress resulting from the strain and distortion of the bridge regions 330 of the first elastic member 507a/second elastic member 507b is thus released. The inner peripheral area 320 of the first elastic member 507a/second elastic member 507b returns to its original position, driving the lens carrier 502 housed therewith to return to the original position as well. During the movement, since the plurality of bridge regions 330 with the same shape and the same width are symmetrically disposed in the accommodating space between the outer peripheral area 310 and the inner peripheral area 320, the inner peripheral area 320 of the first elastic member 507a/ second elastic member 507b can stabilize motion and bear the stress evenly. That is to say, the lens carrier 502 is pushed back to the original position by the restoring force of the first elastic member 507a/second elastic member 507b. During the focusing process of the photographing module 500, the supporting base 508, the outer peripheral area of the first elastic member 507a/second elastic member 507b, the yoke 504, the magnet 505 and the cover 512 do not move at all, while the lens unit 501, the lens carrier 502, the coil 503 and the inner peripheral area of the first elastic member 507a/second elastic member 507b can move back and forth along the optical axis. In the photographing module 500 of the present invention, the lens carrier 502, the coil 503, the yoke 504 and the magnet 505 can be viewed as an electrically controlled focusing mechanism. In this electrically controlled focusing mechanism, the lens carrier 502 and the coil 503 disposed therewith can be viewed together as a movable member; the yoke 504 and the magnet disposed therewith can be viewed as a fixed member.

Alternatively, the entire lens set (including the lens unit 501 and the lens carrier 502) can be viewed as part of the electrically controlled focusing mechanism of the present invention. That is, the lens unit 501, the lens carrier 502 and the coil 503 together can be viewed as a movable member of the mechanism; the yoke 504 and the magnet 505 can be viewed as a fixed member of the mechanism. In addition, the lens unit 501 and the lens carrier 502 can be made integrally into one piece (not shown in the drawing) and be viewed as part of the movable member of the mechanism.

Figure 4:
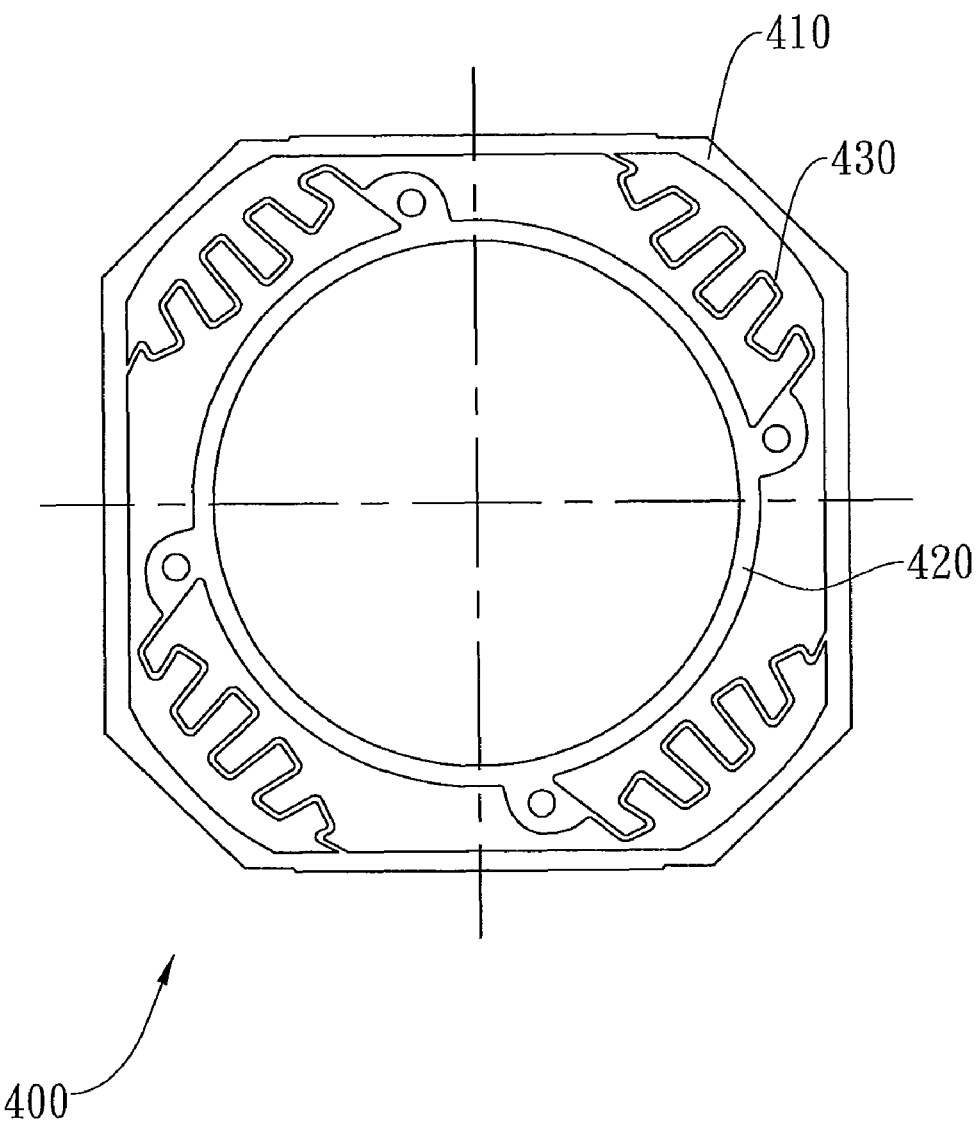
FIG. 4 is a top view of another elastic member used in the photographing module of the present invention.

FIG. 4 is a top view of the first elastic member 507a/second elastic member 507b according to another embodiment of the photographing module 500. As FIG. 4 shows, the elastic member 400 is of a flat plate shape. The elastic member 400 has an outer peripheral area 410, an inner peripheral area 420 and a plurality of bridge regions 430. The inner peripheral area 420 defines a central opening of the elastic member 400; the outer peripheral area 410 and the inner peripheral area 420 define an accommodating space therebetween. The bridge regions 430 are symmetrically disposed in the accommodating space defined by the outer peripheral area 410 and the inner peripheral area 420. Each of the bridge regions 430 has one end connected to the outer peripheral area 410 and the other end connected to the inner peripheral area 420. Each of the bridge regions 430 has a plurality of connected radial segments, with the respective radial segments pointing toward an outer side of the elastic element to form a plurality of symmetrically located centers there. Preferably, the central opening of the inner peripheral area 420 is a circle, and the plurality of bridge regions 430 has the same shape and the same width.

Each of the bridge regions 330 of the elastic member 300 has a plurality of continuous connected radial segments, with the radial segments pointing toward a center of the central opening. In contrast, each of the bridge regions 430 of the elastic member 400 has a plurality of continuous connected radial segments pointing toward centers symmetrically located on an outer side of the elastic element 400. Each bending portion of either the bridge region 330 or 440 that extends along respective radius directions can evenly absorb the accumulated stress coming from a distortion, a plane shift along the optical axis and a certain amount of tilt of the lens unit 501 while it is being rotated for being disposed into the lens carrier 502. Thus, the stress exerted on the elastic member 300/400 is evenly absorbed by each of its connected radial segments; the stress will not be concentrated on the bridge regions 330/430, nor on the connecting joints at the outer peripheral area 310/410 or the inner peripheral area 320/420. This prevents elastic fatigue of the connecting joints, which results from bearing concentrated stress after long use, further prolonging the life span of the elastic member 300/400. Moreover, by disposing the plurality of the bridge regions 330/430 symmetrically in the accommodating space defined by the outer peripheral area 310/410 and the inner peripheral area 320/420, the present invention can efficiently use the accommodating space to effectively lengthen each bridge section 330, 430 of the elastic unit 300/400, thereby reducing its spring constant effectively.

While this invention has been described by way of examples and in terms of preferred embodiments, it is to be understood that this invention is not limited hereto; for example, the electrically controlled focusing mechanism may be made of shape memory alloys. Various changes, substitutions, and alterations can be made herein without departing from the spirit and scope of this invention as defined by the appended claims.

What is claimed is:

1. A photographing module at least comprising a lens unit, an electrically controlled focusing mechanism, an elastic unit, a supporting base and a photosensitive device, wherein:
    said lens unit at least comprises one lens element;
    said electrically controlled focusing mechanism at least comprises a movable member and a fixed member, wherein said movable member has a hollow central portion near an optical axis and is secured to said lens unit; said fixed member is secured to said supporting base; and said movable member is electrically driven to move said lens unit disposed therewith along the optical axis;
    said elastic unit has outer peripheral areas, inner peripheral areas and a plurality of bridge regions, wherein said inner peripheral area defines a central opening; said outer peripheral area and said inner peripheral area define an accommodating space therebetween; said bridge regions are symmetrically disposed in said accommodating space; each of said bridge regions has one end connected to said outer peripheral area and the opposite end connected to said inner peripheral area; each of said bridge regions has a plurality of continuous radial segments which are connected together, with all of the radial segments pointing toward an outer side of the elastic unit to form a plurality of symmetrically distributed centers; said inner peripheral area is attached to said movable member of said electrically controlled focusing mechanism; and said outer peripheral area is attached to said fixed member of said electrically controlled focusing mechanism or with said supporting base;
    said supporting base has a hollow central portion near the optical axis and is disposed with said electrically controlled focusing mechanism; and
    said photosensitive device is disposed with said supporting base at the image side of said photographing module.

2. The photographing module of claim 1, wherein said elastic unit includes a first elastic member and a second elastic member, said first elastic member being disposed above said fixed member, and said second elastic member being disposed between a lower end of said fixed member and said supporting base.

3. The photographing module of claim 1, wherein said plurality of bridge regions have the same shape.

4. The photographing module of claim 1, wherein said plurality of bridge regions have the same width.

5. The photographing module of claim 1, wherein said central opening is circular.

6. A photographing module at least comprising an electrically controlled focusing mechanism, an elastic unit, a supporting base and a photosensitive device, wherein:
    said electrically controlled focusing mechanism at least comprises a movable member and a fixed member, wherein said movable member includes at least one lens element and is centered about an optical axis; said fixed member is secured to said supporting base; and said movable member is electrically driven to move along the optical axis;
    said elastic unit has outer peripheral areas, inner peripheral areas and a plurality of bridge regions, wherein said inner peripheral area defines a central opening; said outer peripheral area and said inner peripheral area define an accommodating space therebetween; said bridge regions are symmetrically disposed in said accommodating space; each of said bridge regions has one end connected to said outer peripheral area and an opposite end connected to said inner peripheral area; each of said bridge regions has a plurality of continuous radial segments which are connected together, with all of the radial segments pointing toward an outer side of the elastic unit to form a plurality of symmetrically distributed centers; said inner peripheral area is attached to said movable member of said electrically controlled focusing mechanism; and said outer peripheral area is attached to said fixed member of said electrically controlled focusing mechanism or with said supporting base;
    said supporting base has a hollow central portion near the optical axis and is disposed with said electrically controlled focusing mechanism; and
    said photosensitive device is disposed with said supporting base at the image side of said photographing module.

7. The photographing module of claim 6, wherein said elastic unit includes a first elastic member and a second elastic member, said first elastic member being disposed above said fixed member, and said second elastic member being disposed between a lower end of said fixed member and said supporting base.

8. The photographing module of claim 6, wherein said plurality of bridge regions have the same shape.

9. The photographing module of claim 6, wherein said plurality of bridge regions have the same width.

10. The photographing module of claim 6, wherein said central opening is circular.

* * * * *